United States Patent Office 3,276,182
Patented Oct. 4, 1966

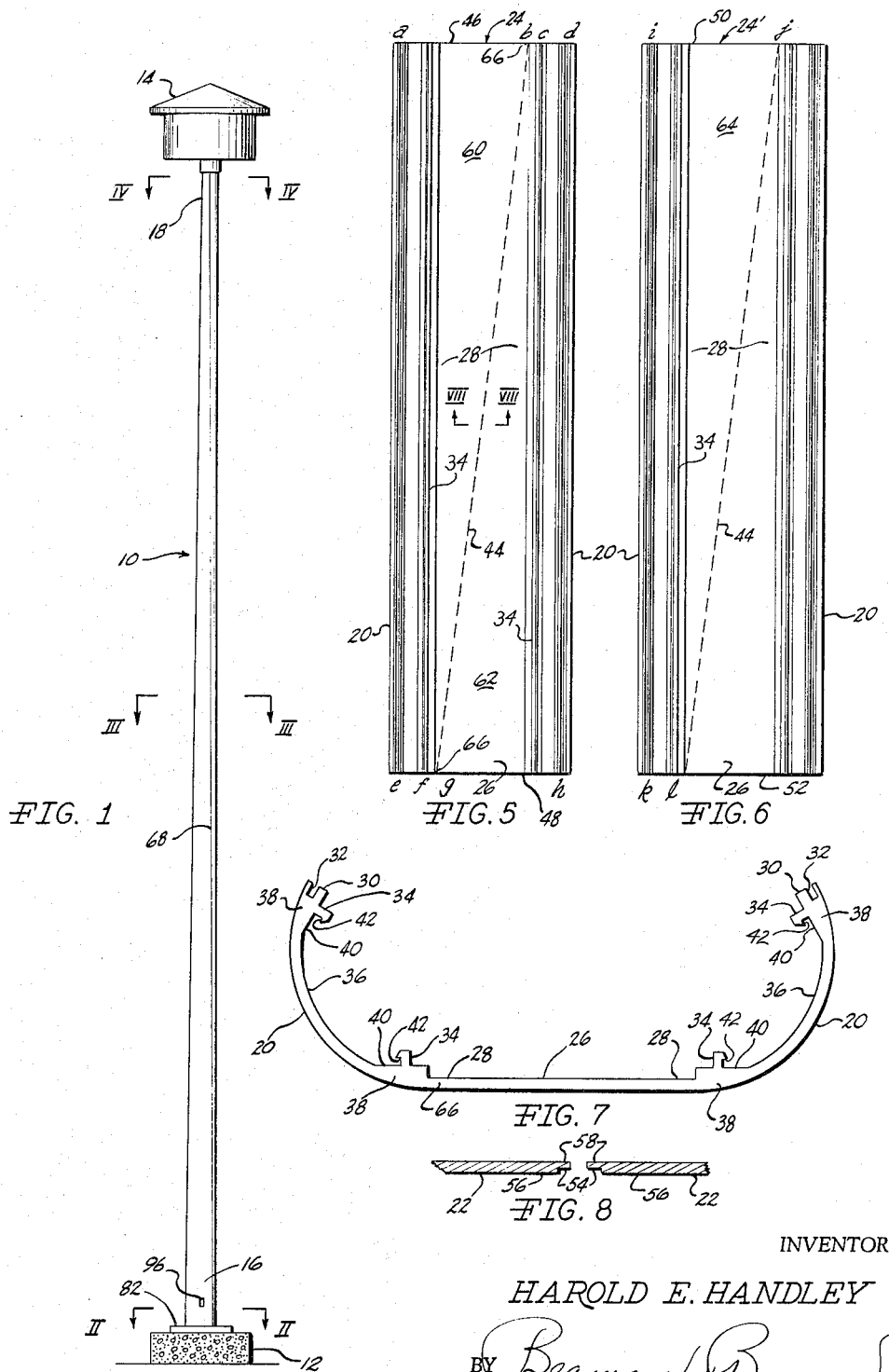

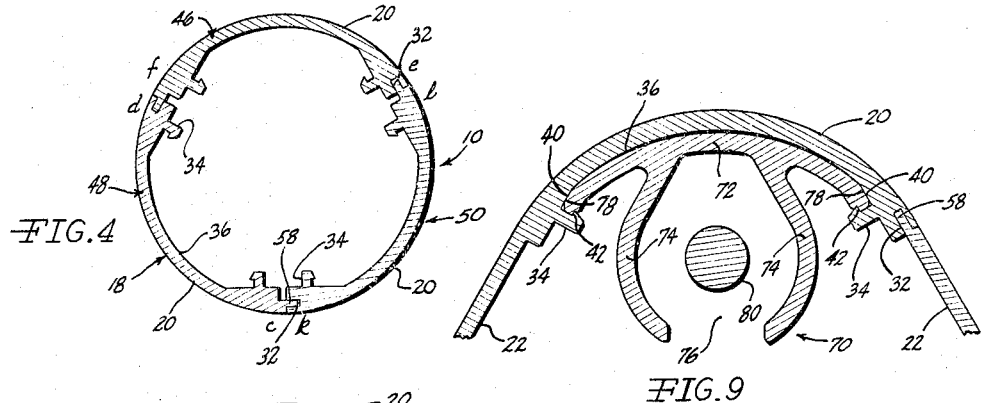

3,276,182
TAPERED STRUCTURAL MEMBER
Harold E. Handley, Jackson, Mich., assignor to McGraw-Edison Company, Elgin, Ill., a corporation of Delaware
Filed Aug. 26, 1963, Ser. No. 304,495
12 Claims. (Cl. 52—731)

The invention pertains to hollow, tapered structural members, and a method for forming the same.

Tapered structural members, such as light poles, electric power transmission poles, and the like, have in the past ordinarily been formed from cylindrical tubes, wherein the tubes are machined to a tapered configuration, usually by a spinning operation. Due to its attractive appearance, lightweight, and excellent resistance to corrosion, aluminum is often employed in the construction of tapered structural members such as are employed as light poles for use in street lighting, parking lot and service station illumination, and the like. The conventional tapered, hollow, aluminum structural members on the market, formed by spinning a cylindrical tube of aluminum into the tapered configuration, are expensive to manufacture, and usually do not have high strength characteristics in that the spinning operation often results in a relatively thin wall construction.

It is an object of the invention to provide a method for making a tapered structural member, and to provide a member, per se, which may be fabricated of low cost elements such as extrusions, wherein the complexity of manufacture and cost of producing tapered structural members is decreased over that of prior manufacturing procedures, and wherein superior strength characteristics are achieved.

It is a further object of the invention to provide a method of forming a hollow, tapered structural member wherein the member may be formed of extrusions, originally of uniform width, which are diagonally severed to define elements employed in the construction of the structural member.

A further object of the invention is to provide a low cost, attractive, high strength, tapered structural member which may be formed from extrusions, and wherein a uniform tapered appearance is produced.

Another object of the invention is to provide a hollow, tapered structural member having top and bottom portions, wherein the cross-sectional configuration of the bottom portion is substantially polygonal, and wherein the top portion is substantially cylindrical.

An additional object of the invention is to provide a hollow, tapered structural member of attractive, clean appearance, wherein internal mounting means are provided which permit a base mounting of the structural member which is not exteriorly visible.

Yet another object of the invention is to provide a structural member, and method of making the same, wherein the structural member is formed of a plurality of elements having longitudinal edges interconnected by adhesive means.

These and other objects of the invention arising from the details and the relationships of the components of an embodiment thereof will be apparent from the following description and accompanying drawings wherein:

FIG. 1 is an elevational view of a structural member embodying the inventive concepts as utilized as a light pole, FIG. 2 is a plan, sectional view of the lower end of the structural member of FIG. 1 taken along section II—II, FIG. 3 is a plan, sectional view of the structural member of FIG. 1 taken along section III—III, FIG. 4 is a sectional, plan view of the top portion of the structural member of FIG. 1, as taken along section IV—IV, FIGS. 5 and 6 are elevational views of a pair of elongated extrusion members from which the structural member, in accord with the described embodiment of the invention, may be constructed, FIG. 7 is an enlarged end view of the elongated extrusion members shown in FIGS. 5 and 6, FIG. 8 is an enlarged detail, sectional view of an extrusion member central portion at the line of severance taken along section VIII—VIII of FIG. 5, FIG. 9 is an enlarged, plan, detail, sectional view of an element arcuate portion and the associated mounting insert as taken along section IX—IX of FIG. 10, and FIG. 10 is an elevational, sectional view of the bottom portion of a base-mounted structural member in accord with the invention illustrating the manner in which the mounting fasteners are tightened upon the mounting inserts.

The general exterior appearance of a hollow, tapered structural member, in accord with the invention, will be appreciated from FIG. 1. In FIG. 1 the structural member 10 is illustrated as being employed as a light pole, and is mounted on a concrete base 12. A light fixture 14 is illustrated as mounted on the top portion of the pole. The structural member 10 is of an elongated configuration and includes a base portion 16 which is mounted on the base 12. The top portion 18 of the structural member serves as the support for the light fixture.

If desired, the structural member 10, in accord with the invention, need not be mounted on a concrete base, but may be inserted into a hole in the ground and supported in the manner of wood telephone poles, and the like.

As will be appreciated from FIG. 2, the cross-sectional configuration of the base portion 16 is substantially triangular, while the cross-sectional configuration of the top portion 18, FIG. 4, is substantially cylindrical. The cross-sectional configuration of an intermediate portion of the structural member 10 is illustrated in FIG. 3. The illustrated structural member embodiment includes substantially cylindrical segment portions 20 and flange portions 22 which are of a planar configuration. The cross section of the top portion of the structural member, as shown in FIG. 4, is composed of the substantially cylindrical segment portions 20, and as these portions are each of such an arc, 120° in the illustrated embodiment, as to constitute that portion of a 360° circumference divided by the number of elements constituting a structural member, the top portion of the structural member will be substantially cylindrical.

The illustrated structural member embodying the inventive concepts is formed in the following manner:

To form a hollow, tapered structural member 10 having a lower bottom triangular portion cross section, a pair of elongated members 24 and 24' having a configuration which will be apparent from FIGS. 5, 6, and 7, is employed. Preferably, elongated members 24 are formed of aluminum extrusions having a cross-sectional configuration which will be apparent from FIG. 7. Elongated members 24 and 24' are of identical configuration and construction, and include a planar central portion 26 defined by longitudinal edge regions 28 extending the length of each member. The outer portions of the members 24 and 24' are formed by the substantially cylindrical, segment, convex portions 20 tangentially disposed to the central portion 26 and extending the longitudinal length of the elongated members. The free longitudinal edges 30 of the substantially cylindrical, convex portions 20 are provided with a groove 32 throughout their length which constitutes the groove of a tongue-and-groove connection, as will be later apparent.

A pair of parallel, spaced projections 34 is associated with the inside surface 36 of each substantially cylindrical segment portion 20. The projections 34 extend inwardly from the segment portion from increased wall thickness portions 38 which define a surface 40 with respect to the inner, cylindrical, segment portion surface 36. An overhanging lip 42 is defined upon each of the projections 34. The projections 34 extend the length of the elongated members 24 and 24', as will be apparent from FIGS. 5 and 6.

For purposes of illustration, the relationship between the width and length of the elongated members 24 and 24', as shown in FIGS. 5 and 6, has been exaggerated, as it will be appreciated that in reality normally the ratio between the length and width of the elongated members will be much greater than that illustrated.

The tapered structural member shown in FIGS. 1 through 4 is formed from the elongated members shown in FIGS. 5, 6, and 7, in the following manner. The elongated members 24 and 24' are each severed diagonally from end to end across the central portions 26 along the dotted lines 44. The severing operation thus forms four elements 46, 48, 50, and 52 from the two members 24 and 24'. Preferably, the severing operation along the dotted line 44 is done by a saw or similar machine tool which will provide a linear severance line which may be accurately positioned. To provide a flush, exterior surface joint, the tool severing the central portions 26 also machines the central portion to form a recess 54 adjacent the exterior surface 56, FIG. 8. The severed edges of the central portions 26, thus, include a tongue 58 of a dimension as to be closely received within the groove 32 defined on the free longitudinal edges of the substantially cylindrical segment portions 20.

After the elongated members 24 and 24' have been severed to define four similar elements of a uniformly varying width, three of the elements 46, 48, and 50, are employed to fabricate the structural member 10 of FIGS. 1 through 4. To form the structural member, the element 46 is reversed relative to the element 48 whereby the end edge $a$–$b$ is disposed upon the same plane as the end edge $g$–$h$. In like manner, the element 50 is inverted that the end edge $i$–$j$ is also disposed on the same plane as the edge $g$–$h$. The severing of the elongated members 24 and 24' has formed a planar flange portion 60 defined on the element 46, a flange portion 62 on the element 48, and a flange portion 64 on the element 50. It will be appreciated that these flange portions are formed from the central portions 26 of the elongated members. The free end of the flange portions 60, 62, and 64 constitutes a longitudinal edge of an element, the other longitudinal edge of the associated element being formed by the free longitudinal edge of the associated substantially cylindrical segment portion. The configuration of the flange portion longitudinal edges is apparent from FIG. 8, and includes the tongue 58 and the recess 54.

The elements end edges $a$–$b$, $g$–$h$, and $i$–$j$ define the bottom end edges of the bottom portions of the associated elements, and as the end edges $c$–$d$, $e$–$f$, and $k$–$l$ are disposed at the upper end of the associated elements, these edges define the top of the element top portions. The elements 46, 48, and 50 are now assembled in the manner which will be apparent from FIGS. 2, 3 and 4. The tongue 58 of flange portion longitudinal edge $b$–$f$ of element 46 is inserted into the groove 32 of the longitudinal edge $d$–$h$ of the element 48. The tongue 58 of the flange portion longitudinal edge $c$–$g$ of element 48 is then inserted into the groove 32 of the longitudinal edge $i$–$k$ of element 50. As the cylindrical segment portions 20 define a 120° arc, the tongue 58 of the flange portion longitudinal edge $j$–$l$ of element 50 may be inserted into the groove 32 of the longitudinal edge $a$–$e$ of element 46 to complete the hollow, tapered structural member configuration.

Prior to the above-described assembly of the elements 46, 48, and 50, the grooves 32 of the elements are filled with an adhesive, whereby upon the accomplishment of the previously described assembly the adhesive will maintain the assembly of the tongue-and-groove connection of the longitudinal edges of the elements. An adhesive is employed which is of high shear resistance characteristics, and preferably the adhesive consists of an epoxy resin. An epoxy resin commercially available and known as Bondmaster manufactured by the Pittsburgh Plate Glass Company is suitable for the purpose of assembling the elements 46, 48 and 50. After the adhesive has cured, the structural member 10 may be employed as desired.

The location of the severing lines 44 will determine the exact configuration of the resultant structural member when assembled. In the disclosed embodiment, the severing line begins and ends at a point, such as shown at 66, FIG. 7, which is the location of tangency of the central portion 26 to the substantially cylindrical segment portion 20. By severing the central portion diagonally, and terminating the line of severance at the point of tangency, the top portion 18 of the structural member will consist solely of the substantially cylindrical segment portions 20, as shown in FIG. 4, wherein the top portion of the structural member will be of a true cylindrical configuration. If the ends of the lines of severance 44 do not occur at the point of tangency between the central portion 26 and a cylindrical segment portion 20, the top portion of the structural member will not consist solely of the segment portions 20, and a noncylindrical configuration will result at the top portion of the structural member. Thus, the configuration of the structural member may be varied by varying the location of the line of severance through the central portion of the elongated members.

It will be appreciated from FIGS. 2, 3, and 4 that the recess 54 is dimensioned so that the tongue-and-groove connection between the longitudinal edges of the elements results in a continuous, flush, exterior surface on the structural member and only a very small seam line 68 will be exteriorly apparent.

As the diagonally severed edges of the central portions 26 forming the tongues 58 are slightly longer in length than the edges 30 and grooves 32, the top and bottom of the structural member will include small "steps" formed by the ends of the elements. If it is desired that the top and bottom of the structural member be parallel and perpendicular to the axis of the structural member, the assembled member ends may be machined accordingly, as by sawing or grinding.

When it is desired to mount the structural member 10 on a base member in abutting relationship, as shown in FIGS. 1 and 10, rather than placing the structural member in a hole, mounting inserts 70 are utilized. The mounting inserts 70 are illustrated in FIGS. 2, 9, and 10, and consist of an extruded member including an arcuate portion 72 substantially conforming to the inner surface 36 of the substantially cylindrical segment portions 20. Arms 74 extend from the arcuate portion to define an elongated recess 76 longitudinally extending through the insert. The longitudinally terminating edges of the arcuate portion 72 are adapted to be positioned under the lips 42 of the projections 34, and surfaces 78 are defined on the insert to correspond with the surfaces 40. Therefore, it will be appreciated that the inserts 70 may be inserted on the inside of the substantially cylindrical segment portions 20 in a close fitting relationship between the inner surface 36 of the substantially cylindrical segment portions 20 and the projections 34. The mounting inserts 70 are related to the associated elements in the manner apparent from FIG. 10, wherein the bottom edge of the inserts is coplanar with the bottom edge of the elements constituting the structural member. An adhesive such as epoxy resin is applied to the projections 34 under the lips, and may also be applied to the surface 36 whereby the inserts 70 are firmly bonded to the associated elements.

In the conventional manner, the base 12 may include vertically disposed bolts 80 extending from the base 12 and a base plate 82. The bolts 80 are spaced in a triangular relationship so as to extend through the recesses 76 of the three inserts 70, FIG. 2. A washer 84 is placed over the end of the bolts to rest upon the upper end of the inserts, which constitutes a shoulder, and nuts 86 are threaded on the bolts. An opening 88 is provided within one of the flange portions of an element to permit entrance of a socket wrench extension 90 having a universal connection 92 associated through a socket 94 whereby the nuts 86 may be tightened to attach the structural member 10 to the base 12. An unobtrusive cap 96 is employed to cover the opening 88, FIG. 1. It will be appreciated that as the inserts 70 and the bolts 80 are all located within the hollow configuration of the structural member 10, the mounting means is not exteriorly apparent and will not detract from the appearance of the structural member.

It is to be appreciated that only one embodiment of the inventive concept is illustrated wherein the inventive principles are shown as incorporated in a structural member having a bottom portion of substantially triangular configuration. By increasing or decreasing the degree of arc of the cylindrical segment portion 20 and by using a greater or fewer number of elements to constitute a structural member, structural members having a bottom portion cross section which is bilateral, rectangular, pentagonal, octagonal, etc., may be produced. It will be appreciated that if the structural member were to be formed of only two elements, the cylindrical segment portions 20 would have to be of 180° configuration. If a rectangular bottom portion configuration were desired, the segment portions 20 would be of 90°, and four elements would have to be employed to construct the structural member. If a structural member of hexagonal bottom portion configuration were desired, six elements would be employed and the segment portions would each be of 60° arcs.

While the longitudinal edges of the elements constituting a structural member may be interconnected by welding, brazing, soldering, riveting, or other well known fastening procedure, the use of an adhesive with a metallic construction provides economical advantages not present with more conventional fastening or bonding means. By employing an adhesive to interconnect the longitudinal edges of the elements, considerable saving in time of manufacture and labor is experienced. Also, second operations are eliminated and a most attractive and clean-line appearance may be achieved.

It is to be understood that the inventive concepts and principles are not to be limited to the described embodiment and that the invention is to be defined only by the scope of the following claims:

I claim:

1. A hollow, elongated, aluminum structural member comprising, in combination, a plurality of elongated elements having a pair of longitudinal edges, an elongated groove defined in one of the longitudinal edges of said elements, the other element longitudinal edge comprising a tongue being received within the groove of the adjacent element, and a high shear stress resistance epoxy resin adhesive within said grooves maintaining assembly of said tongue-and-groove element longitudinal edge connections.

2. A hollow, elongated, tapered structural member having a base portion and a top portion, said member being composed of a plurality of similarly formed elongated elements having longitudinal edges, each of said elements having a base portion and a top portion, said elements including an arcuate, convex portion extending the longitudinal length thereof and a flange portion disposed substantially tangential to said convex portion, the arcuate dimension of said convex portion being substantially uniform throughout the longitudinal length of said elements and the width of said tangential flange portion decreasing from said element base portion to said element top portion, the longitudinal free edges of said tangential flange and convex portions constituting the longitudinal edges of the associated element, and means affixing together the longitudinal edges of adjacent elements, the convex portion edge of an element being affixed to the flange portion edge of the adjacent element to form a structural member wherein similar, respective base and top portions of said elements are adjacently disposed defining the structural member base and top portions.

3. A hollow, elongated, tapered structural member having a base portion and a top portion, said member being composed of a plurality of similarly formed elongated elements having longitudinal edges, each of said elements having a base portion and a top portion, said elements including a substantially cylindrical segment portion extending the longitudinal length thereof and a flange portion disposed substantially tangential to said cylindrical segment portion, the arcuate dimension of said cylindrical segment portion being substantially uniform throughout the longitudinal length of said elements and the width of said tangential flange portion decreasing from said element base portion to said element top portion, the longitudinal free edges of said tangential flange and cylindrical segment portions constituting the longitudinal edges of the associated element, and means affixing together the longitudinal edges of adjacent elements, the cylindrical segment portion edge of an element being affixed to the flange portion edge of the adjacent element to form a structural member wherein similar, respective base and top portions of said elements are adjacently disposed defining the structural member base and top portions.

4. In a hollow, elongated, tapered structural member as in claim 3, wherein the longitudinal edge of said flange portion substantially coincides with the location of tangency of said flange portion with said cylindrical segment portion at said top portions of the elements comprising a structural member, whereby said structural member top portion configuration is substantially formed by said cylindrical segments and is subtsantially of cylindrical configuration.

5. In a hollow, elongated, tapered structural member as in claim 3, wherein a pair of spaced, parallel, elongated projections are defined on and project from the inner surface of said substantially cylindrical segment portions, and extend in the longitudinal direction of the associated cylindrical portions, and an insert having fastener means thereon interposed between said projections of each cylindrical segment portion to mount said structural member on a base and fasten it thereto.

6. In a hollow, elongated, tapered structural member as in claim 3, wherein a groove is integrally defined in one of the longitudinal edges of each of said elements and a tongue is defined on the other longitudinal element edge whereby the tongue of one element is received within the groove of the adjacent element, and adhesive means within said grooves comprising said means for affixing the elements of the structural member together.

7. In a hollow, elongated, tapered structural member as in claim 5, wherein said inserts are affixed to the associated projections by adhesive means, and said fastener means comprises a shoulder defined on said insert.

8. In a hollow, elongated, tapered structural member as in claim 6, wherein said elements are formed of aluminum.

9. In a hollow, elongated, tapered structural member as in claim 6, wherein said adhesive means comprises an epoxy resin.

10. A hollow, elongated, tapered structural member having a base portion and a top portion, said member being composed of a plurality of similarly formed extruded elongated elements having longitudinal edges, each of said elements having a base portion and a top portion, said elements including a substantially cylindrical segment portion extending the longitudinal length thereof and a flange portion disposed substantially tangentially to said cylindrical segment portion, the arcuate dimension of said cylindrical segment portion being substantially uniform throughout the longitudinal length of said elements and said flange portion being substantially planar and decreasing in width from the element base portion to said element top portion, the longitudinal free edge of said flange portion substantially coinciding with the location of tangency of said flange portion with said cylindrical segment portion at the top portion of the associated element, the longitudinal free edges of said tangential flange and cylindrical segment portions constituting the longitudinal edges of the associated element, and means affixing together the longitudinal edges of adjacent elements, the cylindrical segment portion edge of an element being affixed to the flange portion edge of the adjacent element to form a structural member wherein similar, respective base and top portions of said elements are adjacently disposed defining the structural member base and top portions.

11. A hollow, elongated, tapered structural member having a base portion and a top portion, said member being composed of a plurality of similarly formed elongated elements having longitudinal edges, each of said elements having a base portion and a top portion, said elements including a substantially cylindrical segment portion of substantially 120° extending the longitudinal length thereof and a substantially planar flange portion depending from said cylindrical segment portion substantially tangential thereto, the arcuate dimension of said cylindrical segment portion being substantially uniform throughout the longitudinal length of said elements and the width of said tangential flange portion decreasing from said element base portion to said element top portion, the longitudinal free edges of said tangential flange and cylindrical segment portions constituting the longitudinal edges of the associated element, and means affixing together the longitudinal edges of adjacent elements, the cylindrical segment portion edge of an element being affixed to the flange portion edge of the adjacent element to form a structural member wherein similar, respective base and top portions of said elements are adjacently disposed defining the structural member base and top portions.

12. In a hollow, elongated, tapered structural member as in claim 11, wherein said structural member is composed of three elongated elements and the longitudinal edge of said flange portion substantially coincides with the location of tangency of said flange portion with said cylindrical segment portion at said top portions of the elements comprising a structural member, whereby said structural member top portion configuration is substantially cylindrical and formed by three 120° cylindrical segment portions of the elements constituting the structural member.

References Cited by the Examiner

UNITED STATES PATENTS

| | | | |
|---|---|---|---|
| 449,125 | 3/1891 | Lieb | 52—720 |
| 549,053 | 10/1895 | Blow | 174—45 |
| 2,718,117 | 9/1955 | Boyle et al. | 189—36 |
| 2,825,431 | 3/1958 | Molt | 138—157 |
| 3,104,454 | 9/1963 | Handley et al. | 29—155 |
| 3,128,536 | 4/1964 | Eckhardt | 29—155 |

FOREIGN PATENTS

| | | |
|---|---|---|
| 18,743 | 1904 | Great Britain. |

FRANK L. ABBOTT, *Primary Examiner.*

RICHARD W. COOKE, JR., *Examiner.*

R. S. VERMUT, *Assistant Examiner.*